Oct. 20, 1925.
L. G. WELLDE
1,557,638
ADJUSTMENT MEANS FOR STEERING WHEELS
Filed Oct. 4, 1923
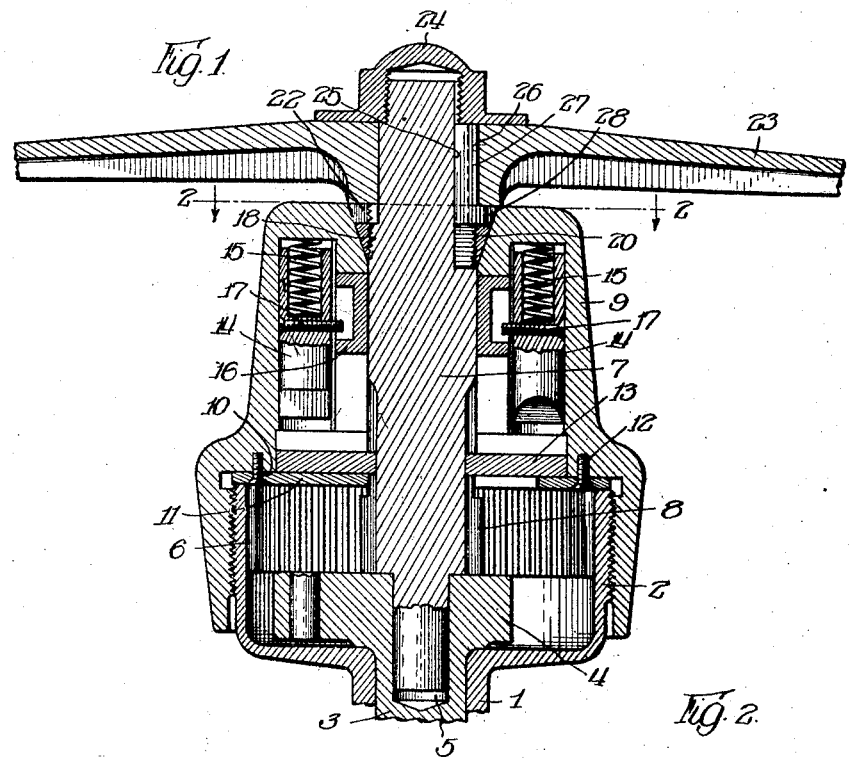
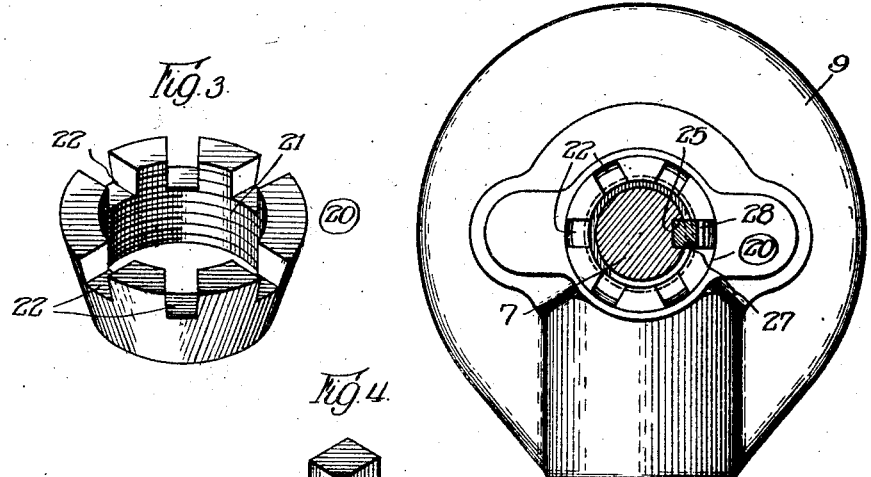
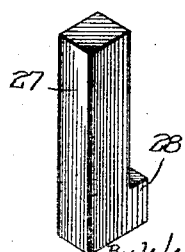
Witness:
G. Burkhardt
Inventor:
Louis G. Wellde,
By Wilkinson, Huxley, Byron & Knight
Attys Patented Oct. 20, 1925.

1,557,638

UNITED STATES PATENT OFFICE.

LOUIS G. WELLDE, OF CHICAGO, ILLINOIS, ASSIGNOR TO RICHARD M. DECKER COMPANY, OF CHICAGO, ILLINOIS, A COPARTNERSHIP CONSISTING OF RICHARD M. DECKER, F. B. HARRIMAN, H. M. DECKER, S. P. HARRIMAN, AND L. M. HARRIMAN.

ADJUSTMENT MEANS FOR STEERING WHEELS.

Application filed October 4, 1923. Serial No. 666,427.

*To all whom it may concern:*

Be it known that I, LOUIS G. WELLDE, a citizen of the United States, residing at Chicago, in the county of Cook and State of Illinois, have invented certain new and useful Improvements in Adjustment Means for Steering Wheels, of which the following is a specification.

The present invention relates to adjustment means for steering wheels.

The present invention will be illustrated and described in connection with the well known Ford type of steering mechanism, said mechanism being shown with a locking device.

As is well known, the Ford construction utilizes a stub shaft at the top of the steering column which carries the steering wheel. If play develops between said stub shaft and its supporting parts, said play is very greatly multiplied at the rim of the steering wheel. Though the invention has been illustrated in connection with the Ford steering mechanism, it will be clear, as the description proceeds, that the invention is of much wider application.

An object of the present invention is to provide a construction readily applicable to Ford cars and by which play in the steering wheel shaft may be conveniently taken up.

A further object is to provide readily adjustable means for taking up play in a steering shaft, which means will be securely held in adjusted position.

A further object is to provide adjusting means for steering mechanism which will be effective in operation, unobtrusive in appearance, convenient in operation and secure in its adjustment.

Further objects will appear as the description proceeds.

Referring to the drawings:

Figure 1 is a sectional view taken along a plane parallel with the axis of the steering column of the motor car;

Figure 2 is a sectional view taken along the plane indicated by the arrows 2—2 of Figure 1; and Figures 3 and 4 illustrate details of construction.

The numeral 1 indicates the steering column of an automobile, which steering column is provided at its upper extremity with the enlarged cup 2. The numeral 3 indicates a steering shaft which is provided with a spider 4 at its upper extremity, said spider 4 and steering shaft 3 providing a socket 5 which is circular in cross section. The spider 4 provides mounting means for planetary gears, not shown, which are adapted to mesh with the internal gear 6 on the inside of the cup 2.

The parts described up to this point are all well known parts of the Ford steering mechanism. The numeral 7 indicates a stub shaft which is provided with gear teeth 8, which gear teeth 8 operate in a manner well understood by those skilled in the art, to communicate steering motion through the planetary gears, not shown, to the spider 4 and steering shaft 3.

According to the structure illustrated, which includes certain locking mechanism, the cap for the cup 2, as ordinarily provided in Ford cars is replaced by the cap or housing 9 which may be of tool resisting material. Said cap 9 may be provided near its lower extremity with internal screw threads adapted to engage with the external screw threads ordinarily provided on the cup 2 of a Ford motor car The cap 9 encircles the stub shaft 7 and, according to the present invention, serves to support a bearing for the upper extremity of said stub shaft 7, the lower extremity of said stub shaft 7 having its bearing in the socket 5 at the top of the steering shaft 3.

Mounted upon the internal shoulder 10 of the cap 9 is the plate 11 which may be connected to the cap by means of screws 12 or other holding means. Bearing upon said plate 11 is the ratchet plate 13 which is non-rotatably connected to the stub shaft 7. The ratchet plate 13 is adapted to be engaged by the pair of plungers 14, 14, each of which is adapted to have a movement parallel with the axis of the stub shaft 7. Said plungers 14, 14, have beveled lower edges and are spring pressed toward the ratchet plate 13 by means of the springs 15, 15. Said plungers 14, 14 ride in corresponding cylindrical holes and when in their lowermost positions effectually prevent rotation in one direction of the ratchet 13 and stub shaft 7 relative to the cap 9, though permitting rotation in the opposite direction.

Movement of the plungers 14, 14 may be controlled by the collar 16 which cooperates with the pins 17, 17, which pins 17, 17 extend into the path of movement of the collar 16. The collar 16 is lock controlled and is held in either its uppermost position or lowermost position by any approved type of lock not shown.

The upper end of the cap 9 is bored out in conical formation, said conical formation being symmetrical with the axis of the stub shaft 7. Said stub shaft 7 near its upper extremity is provided with threads 18 adapted to cooperate with corresponding screw threads upon the collar 20. The collar 20 is an annular member having the internal screw thread 21 for engagement with the screw threads 18 of the stub shaft 7. The outer wall of the collar 20 is of conical formation to correspond with the bored out portion at the upper end of the cap 9. The larger extremity of the collar 20 is provided with a plurality of circumferentially spaced slots 22, the purpose of which will appear presently.

Numeral 23 indicates a steering wheel adapted to fit over the upper end of the stub shaft 7, said steering wheel being held in place on said stub shaft by means of the nut 24. For the purpose of providing a non-rotatable connection between the steering wheel 23 and the stub shaft 7, the stub shaft 7 is provided with a keyway which is indicated by numeral 25, the steering wheel 23 being provided with a cooperating keyway 26. The keyway 25 extends downwardly into cooperative relationship with the collar 20, and said keyway 25 has mounted therein the key 27. As indicated in Figures 1 and 4 the key 27 has the offset shoulder 28, which offset shoulder 28 is adapted to ride in any one of the slots 22, 22 of the collar 20, whereby to hold said collar 20 against rotating movement relative to the stub shaft 7.

The manner in which the above described embodiment of the present invention accomplishes the objects above set forth will be clear without detailed description. The stub shaft 7, acting about the lower extremity of said stub shaft as a pivot, will have considerable tendency to shake in the upper portion of the cap 9. This tendency to shake is present not only in the specific structure illustrated, but in many other forms of steering mechanism with which applicant is familiar. Whether said steering mechanism is provided with a steering wheel lock of the kind illustrated, or of a different kind, or whether there is no steering wheel lock, the present invention serves to take up all play and remove a tendency to shake by reason of the fact that the wedge shaped collar 20, which has a screw threaded engagement with the stub shaft 7, may be turned down to the degree desired to provide a free running bearing between the upper portion of cap 9 and the outer conical portion of said collar 20. When said collar 20 has been turned down to the position desired to eliminate shake, one of the slots 22, 22 of said collar will be in register or nearly so with the keyway 25 of the stub shaft 7. If no slot 22 is in exact register with the keyway 25, the collar 20 may be turned a fraction of a revolution, whereby to bring about said registration. The key 27 may now be inserted in the keyway 25, the offset shoulder 28 of said key lying within one of the slots of collar 20. With the keyway in place there is no possibility for relative movement between collar 20 and the stub shaft 7 and said members will operate as a unit. The steering wheel 23 may be readily mounted upon the stub shaft 7 and key 27, and the nut 24 will hold said steering wheel in place. If, at any time during service, shake should develop in the stub shaft 7, due to wear or from other cause, it is a simple matter to remove the nut 24, steering wheel 23 and key 27, whereupon the collar 20 may be turned down upon the stub shaft 7, to again bring about a close running fit between the outer conical surface of said collar 20 and the inner conical surface of the upper end of the cap 9.

By the very simple expedient above described shake in the stub shaft may be effectually eliminated. It should be particularly noted that the adjusting mechanism is entirely independent of the particular car locking mechanism disclosed, but is applicable to any steering shaft in which play is likely to occur.

Though a preferred embodiment of the present invention has been illustrated, many modifications will occur to those skilled in the art. It is intended in this patent to cover all such modifications as fall within the scope of the invention as defined by the appended claims.

What is claimed is:

1. Steering wheel construction comprising a rotatable shaft, an enclosed housing member for said shaft, adjustment means having screw threaded engagement with said shaft, said housing member and said adjustment means having corresponding conical bearing surfaces whereby upon the turning of said adjustment means, play between said adjustment means and said housing may be minimized, said shaft being provided with a key slot and said adjustment means being provided with a plurality of key slots adapted to register with the key slot in the said shaft.

2. Steering wheel construction comprising a rotatable shaft, an enclosed housing member for said shaft, adjustment means having screw threaded engagement with said shaft, said housing member and said adjustment means having corresponding conical bearing surfaces whereby upon the turning of said adjustment means, play between said adjustment means and said housing may be minimized, said shaft being provided with a key slot and said adjustment means being provided with a plurality of key slots adapted to register with the key slot in the said shaft, said shaft being provided with a steering wheel, and means holding said steering wheel in non-rotative connection with said shaft and holding said adjustment means in non-rotative connection with said shaft.

3. In combination, a rotatable shaft, a housing therefor, an adjustment member for preventing shake between said shaft and said housing, said adjustment member comprising an internally screw threaded collar of wedge shaped cross-section, said housing being provided with a wedge shaped recess for receiving said collar, said collar being provided with a plurality of circumferentially spaced key receiving recesses, said shaft being provided with a steering wheel mounted thereon, and a key for preventing relative rotation between said steering wheel and said shaft and between said collar and said shaft.

4. Steering wheel construction comprising a rotatable shaft, an enclosed housing member for said shaft, adjustment means having screw threaded engagement with said shaft, said housing member and said adjustment means having corresponding conical bearing surfaces whereby upon the turning of said adjustment means, play between said adjustment means and said housing may be minimized, said shaft being provided with a key slot and said adjustment means being provided with a plurality of key slots adapted to register with the key slot in the said shaft, said shaft being provided with a steering wheel, and a unitary key holding said steering wheel in non-rotative connection with said shaft and holding said adjustment means in non-rotative connection with said shaft.

5. In combination, a steering column having a member at its upper end provided with a conical recess, a shaft mounted within said recess and an adjusting nut having a conical contour fitting said recess, a steering wheel on said shaft, said steering wheel having a keyway, said shaft having a keyway, said adjusting collar having circumferentially spaced slots at one of its ends and a key fitting said keyways and one of said slots.

Signed at Chicago, Illinois, this 26th day of September, 1923.

LOUIS G. WELLDE.